Jan. 18, 1955

O. GRAY ET AL 2,699,946

PHONOGRAPH CONTROL SYSTEM

Filed Dec. 18, 1950

INVENTORS
Ornburn Gray
Walter R. Durnford

ATTYS.

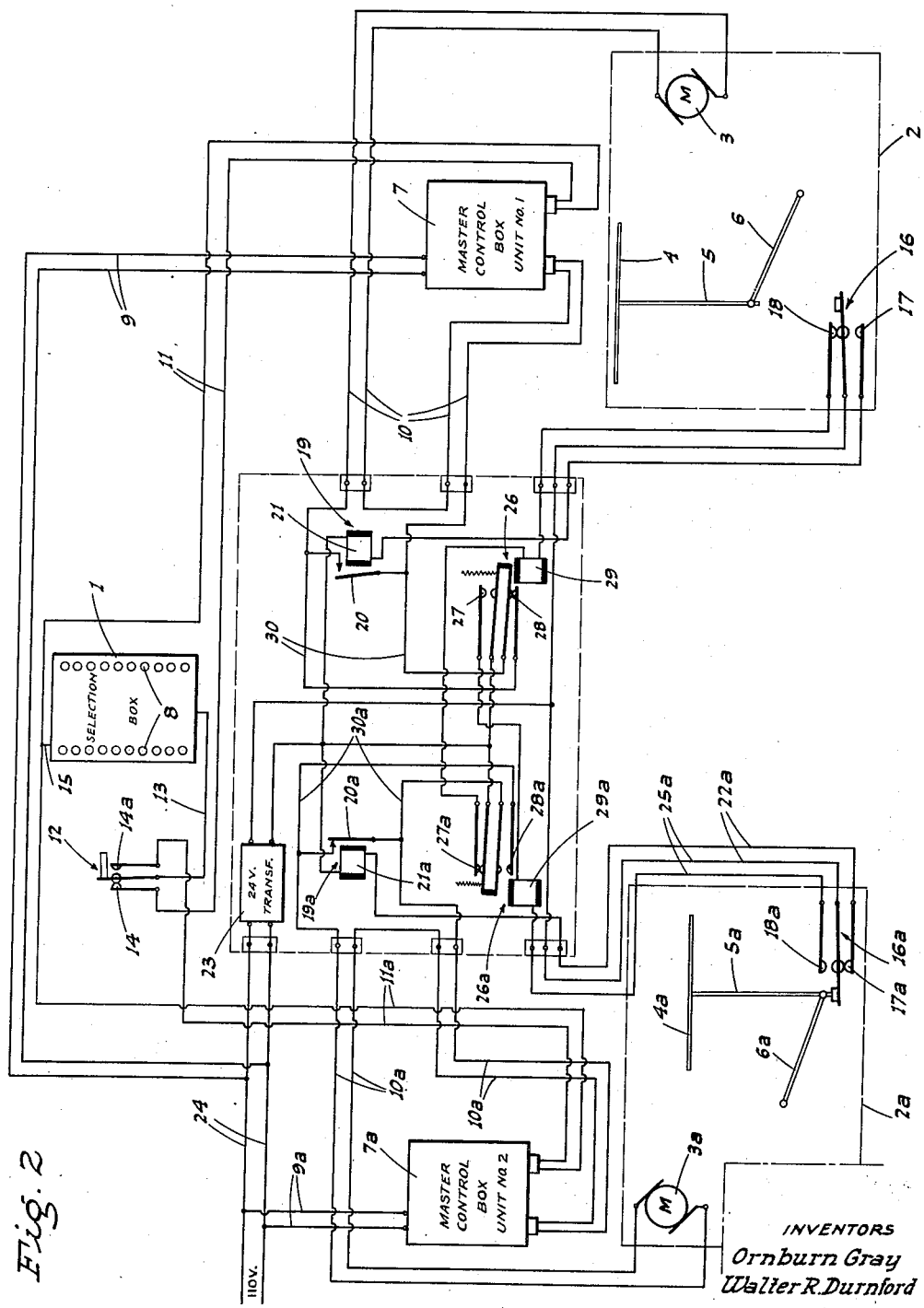

Jan. 18, 1955  O. GRAY ET AL  2,699,946
PHONOGRAPH CONTROL SYSTEM
Filed Dec. 18, 1950  4 Sheets-Sheet 3
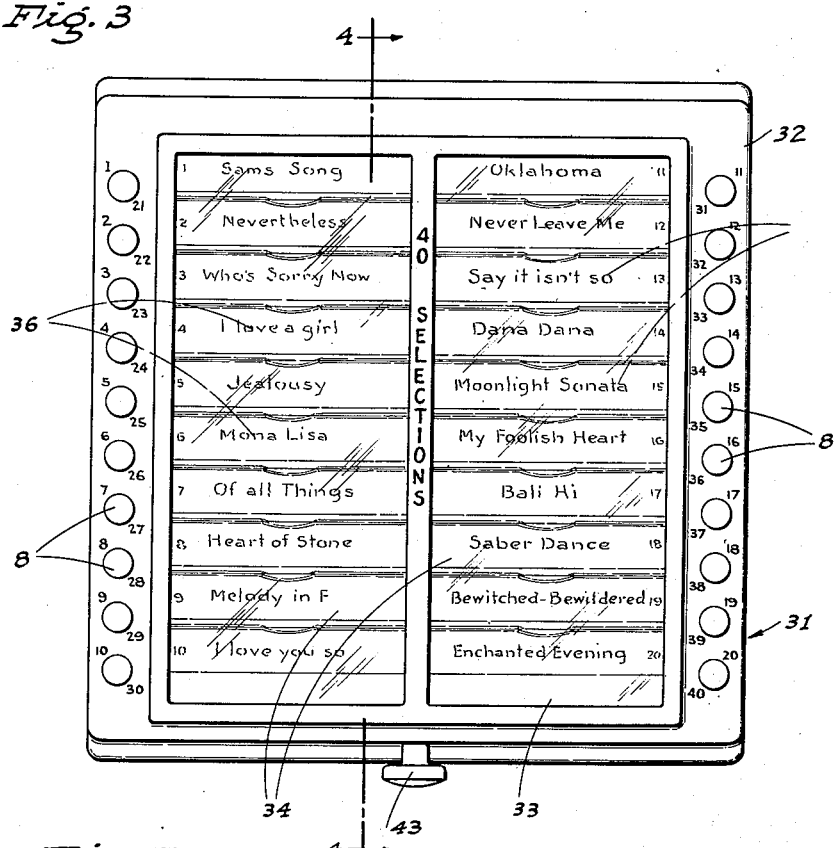
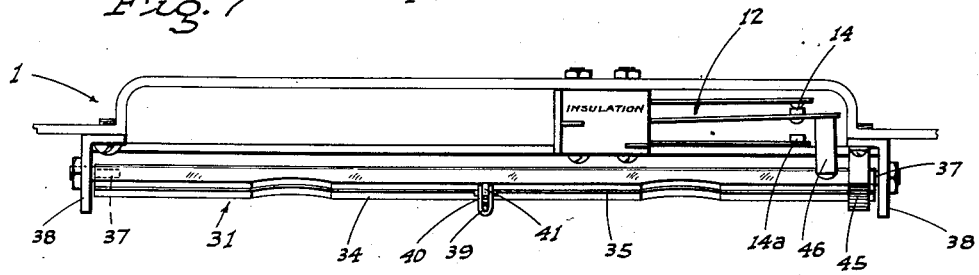
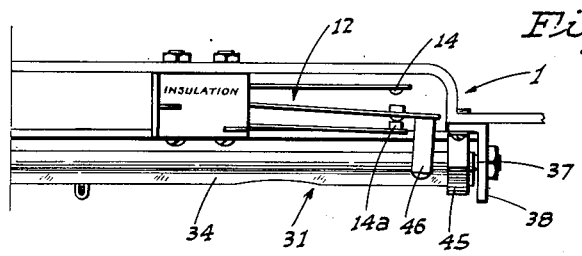
INVENTORS
Ornburn Gray
Walter R. Durnford
ATTYS.

Jan. 18, 1955    O. GRAY ET AL    2,699,946
PHONOGRAPH CONTROL SYSTEM
Filed Dec. 18, 1950    4 Sheets-Sheet 4
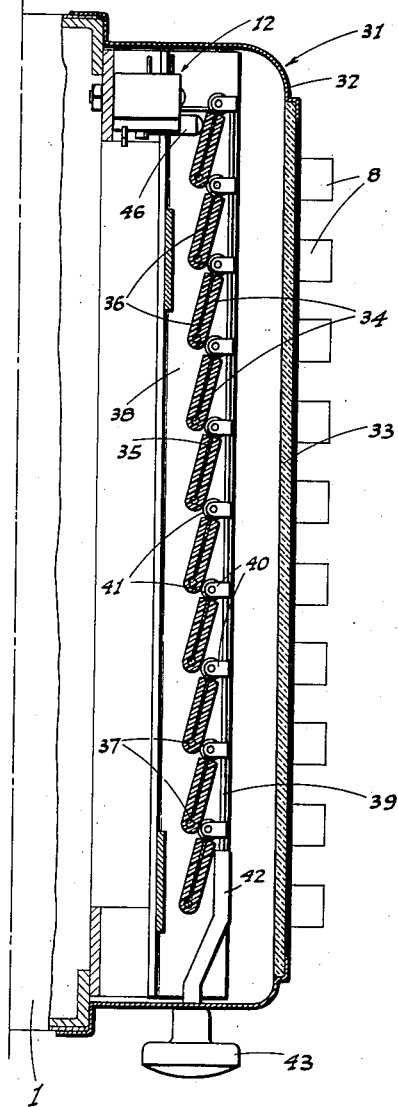
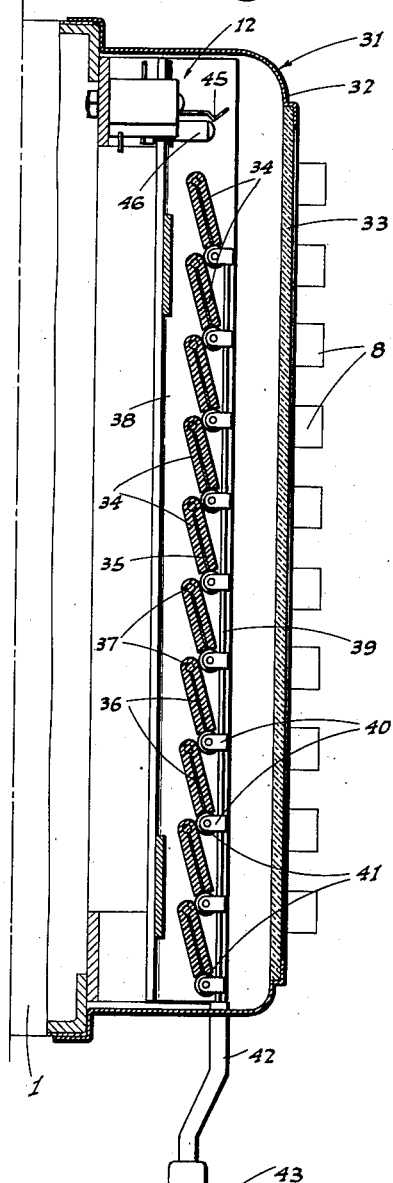
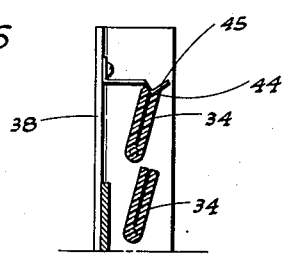
INVENTORS
Ornburn Gray
Walter R. Durnford
ATTYS

United States Patent Office 2,699,946
Patented Jan. 18, 1955

2,699,946
PHONOGRAPH CONTROL SYSTEM

Ornburn Gray, North Sacramento, and Walter R. Durnford, Placerville, Calif., assignors to Ornburn Gray, Walter R. Durnford, and Quinton B. Lain, all of Sacramento, and Joseph Delucchi, Stockton, Calif.

Application December 18, 1950, Serial No. 201,289

1 Claim. (Cl. 274—10)

This invention relates generally to automatic phonographs or record players, particularly the commercial type known as "juke" boxes and as used in public establishments for entertainment.

This type of automatic phonograph is remote-controlled from one or more selection boxes, each such box carrying a program listing the several available selections, and being provided with instrumentalities for making the selections.

It is a major object of this invention to provide a novel control system wherein each selection box includes a two-sided or reversible program holder to multiply the number of available selections; the box, when one side of the program holder is visual for use, controlling one automatic phonograph, while said box, when the other side of the reversible holder is visual for use, controlling a separate automatic phonograph, likewise disposed to play within the hearing range of the same selection box.

In other words, a single selection box is employed to control two automatic phonographs, but one at a time and pursuant to selections made from the corresponding side of the reversible program holder.

The system is especially designed, but not limited, for use with a selection box, and dual automatic phonographs, of conventional design; the system including, as an attachment, the reversible program holder for such selection box.

Another major object of the invention is to provide a dual phonograph control system, as above, which includes a novel, multiple circuit for the control, selectively, of the two automatic phonographs; the arrangement being such that manual reversing of the program holder to one side or the other automatically places the corresponding circuit in condition to cause operation of the related automatic phonograph.

A further object of the present invention is to provide a phonograph control system, as in the preceding paragraph, wherein the multiple circuits, corresponding to the pair of automatic phonographs, are so inter-related that when one circuit is in operation, the other circuit, and the corresponding automatic phonograph, cannot be placed in operation.

An additional object of the invention is to provide a novel reversible program holder for use in a dual phonograph control system of the type described.

Still another object of the invention is to provide a practical and reliable dual phonograph control system, and one which will be exceedingly effective for the purpose for which it is desired.

These objects are accomplished by means of such structure and relative arrangement of parts as will fully appear by a perusual of the following specification and claim.

In the drawings:

Fig. 2 is a similar view, but shows the multiple circuits with the switching parts thereof in the positions occupied thereby to control the other of the automatic phonographs.

Fig. 3 is a front elevation of the selection box showing the reversible program holder.

Fig. 4 is an enlarged cross section of the shutter-like, title retaining plates shown in one position; the view being on line 4—4 of Fig. 3.

Fig. 5 is a similar view, but shows such title retaining plates in the reverse position.

Fig. 6 is a fragmentary cross section, as in Fig. 4, showing the manner of frictionally but releasably locking the program holder in what may be termed its "up" position.

Fig. 7 is a top plan view of the program holder with the cover removed to show the adjacent circuit reversing switch; the switch being shown with its parts in the positions occupied thereby when the circuit is in the condition of Fig. 1.

Fig. 8 is a similar view, but shows such reversing switch in its opposite position.

Figure 1:
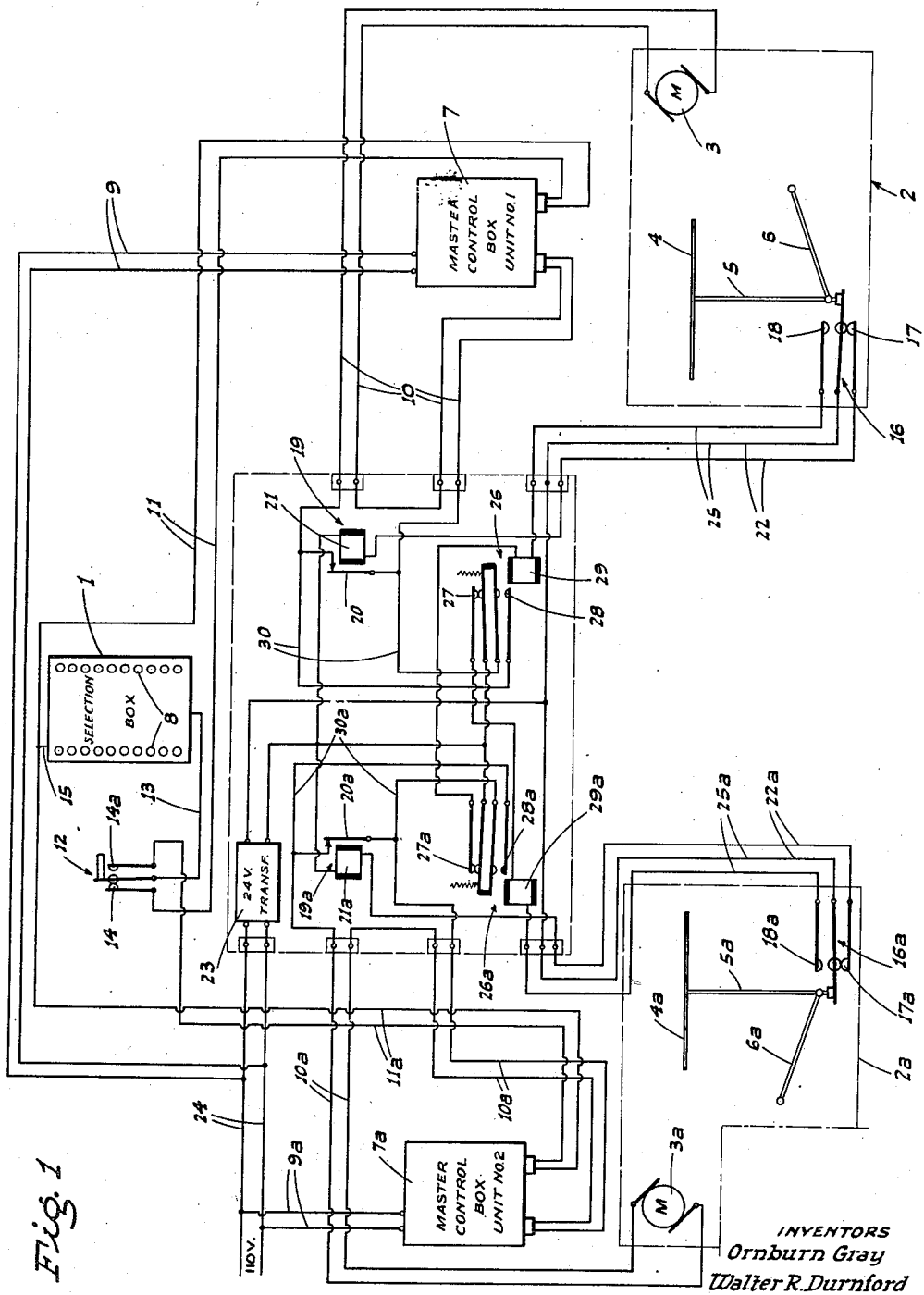
Fig. 1 is a diagrammatic representation of the system, including the multiple circuits; the switching parts of the latter being in the positions occupied thereby to control one of the automatic phonographs.

Referring now more particularly to the characters of reference on the drawings, the novel, dual phonograph control system includes a selection box, indicated generally at 1; the present disclosure reflecting only a single box, but it is to be understood that a number of such boxes are employed in parallel for selective control of the dual phonographs from different points.

The automatic record player units of the two phonographs are indicated diagrammatically at 2 and 2a; the phonographs being not otherwise shown. Further, for the purpose of this invention, it suffices that each of the automatic record player units be shown diagrammatically, including solely the corresponding motors 3 and 3a; the turntables 4 and 4a; the vertically movable turntable supporting and rotating spindles 5 and 5a; and the spindle lift arms 6 and 6a, respectively.

The system includes multiple circuits, with a circuit corresponding to each of the automatic record player units 2 and 2a; the circuit for the automatic record player unit 2 comprising:

The numeral 7 indicates the master control box unit for the automatic record player unit 2; such control box unit being identified as "No. 1" and including conventional instrumentalities for the selection, of records to be played, in response to manipulation of push buttons 8 on the selection box 1.

The master control box unit 7 is energized by a power supply circuit 9, and a motor energizing circuit 10 leads from the master control box unit 7 to the motor 3; such control box unit being connected to the selection box 1 by a control circuit 11. One lead of the control circuit 11 is connected to one side of a two-way reversing switch 12 having a common lead 13 extending to the selection box 1; such two-way reversing switch 12 including a switch 14 which is closed, in the manner hereinafter described, when the circuit including the master control box unit 7 for the automatic record player unit 2 is in operation.

The other lead of the control circuit 11 conencts to a common lead 15 extending to the selection box 1.

The reversible program holder which is mounted on the selection box 1 will hereinafter be described in detail, and it here suffices to state that when such holder is in one position the reversing switch 12 is mechanically shifted to the position occupied thereby in Fig. 1 with switch 14 closed.

With switch 14 closed, depression of a selected one of the push buttons 8 of the selection box 1 produces a corresponding reaction in the master control box unit 7, whereupon the motor energizing circuit 10 becomes alive and the motor 3 begins to function. When the motor 3 begins to function, the spindle lift arm 6, as is conventional in automatic phonographs of the type described, begins to raise the vertically movable spindle 5 and turntable 4.

A two-way switch 16 is connected to the spindle 5 in a manner such that one switch 17 is closed when the spindle 5 is at its lowermost point of movement; such switch 17 opening and the other switch 18 substantially simultaneously closing with initial upward motion of said spindle 5 by the spindle lift arm 6 which is actuated from the motor 3.

A primary relay 19 having a switch 20 interposed in the motor energizing circuit 10 is initially closed; i. e. the coil 21 of the relay 19 is initially energized by a primary relay energizing circuit 22 having the switch 17 interposed therein. The primary relay energizing circuit 22 leads from a 24-volt transformer 23 having connection with a power supply circuit 24.

The switch 18, which closes substantially simultaneously upon opening of the switch 17, is interposed in a secondary relay energizing circuit 25, fed from transformer 23, and including a secondary relay 26; the latter comprising a top switch 27, a bottom switch 28, and a coil 29. The coil 29 is interposed in the circuit 25, as shown.

The top switch 27 of the secondary relay 26 is normally closed, but upon energization of the coil 29 by the secondary relay energizing circuit 25 (which comes into play when switch 18 closes), the top switch 27 opens and the bottom switch 28 closes.

The bottom switch 28 is interposed in a secondary motor energizing circuit 30 connected across the switch 20 of the primary relay 19; the result being that when the top switch 27 opens and the bottom switch 28 closes upon energization of the coil 29, the secondary motor energizing circuit 30 comes into play to cause continued operation of the motor 3 for playing of the selected record by the automatic record player unit 2. During playing of such selected record the top switch 27 remains open, and while this switch is open the circuit for the automatic phonograph which includes the automatic record player unit 2a cannot place the latter in operation, as will appear.

Although distinguished by the suffix a, the parts of the circuit, corresponding to the automatic record player 2a, bear the same reference numerals as the corresponding parts of the hereinbefore described circuit relating to the automatic record player 2.

The top switch 27, of the secondary relay 26, is interposed in the secondary relay circuit 25a for the coil 29a, whereby when the automatic record player unit 2 is in operation, as previously described, the automatic record player unit 2a cannot be advanced to a record playing condition. In short, when the top switch 27 is open, the coil 29a cannot be energized to cause closing of the bottom switch 28a of the secondary relay 26a, with the consequence that the motor 3a cannot run beyond the primary part of its cycle, as the secondary motor energizing circuit 30a remains open.

Similarly, when the circuit for the automatic record player unit 2a is in operation, including closing of the switch 28a and opening of the switch 27a of the secondary relay 26a, the circuit for the automatic record player unit 2 is effectively blocked or held open.

In connection with the foregoing multiple circuits for the dual automatic phonographs, the selection box 1 is fitted with a reversible program holder, indicated generally at 31, and which holder is constructed as follows:

To the face of the conventional selection box 1, there is fitted a housing 32 through which the push buttons 8, of the selection box 1, project on opposite sides of a pair of upstanding, transversely spaced windows 33.

A plurality of shutter-like title retaining plates 34 extend transversely in the housing 1 inwardly of the windows 33 in a vertical row; the title retaining plates 34 being transparent and slotted, lengthwise—as at 35—to receive title slips 36. There is a pair of title slips 36 inserted in each plate 34, so that each slip corresponds to one of the push buttons 8 in the adjacent vertical row thereof. The title slips 36 are imprinted with the title of a phonograph record on each side thereof; the titles on one side of said slips corresponding to the records in one of the automatic phonographs, while the titles on the other side of the slips correspond to the records in the other automatic phonograph.

The title retaining plates 34 are pivoted at the ends and adjacent one edge, as at 37, to upstanding end bars 38, whereby said plates may be swung from an upwardly extending position with one side of the title slips 36 visible through the windows 33, as in Fig. 4, to a downwardly extending position with the other side of the title slips visible through the windows 33, as in Fig. 5.

The title retaining plates 34 are adapted to be simultaneously shifted between said positions by a vertically movable shift bar 39 having ears 40 linked, as at 41, to the corresponding plates 34 at the edge opposite the pivots thereof.

At its lower end the shift bar 39 is connected to a push-pull rod 42 which extends out of the lower end of the program holder, and is there fitted with a finger knob 43.

When the finger knob 43 is pushed upwardly, as in Fig. 4, to swing the title retaining plates 34 to their upwardly extending position, the uppermost one of such plates, which is notched, as at 44, engages in releasable but friction holding relation with a spring finger 45 which prevents accidental down-swinging of said plates.

The two-way reversing switch 12 is mounted in the top of the housing 32 of the program holder 31, and when the title retaining plates 34 are swung to their upwardly extending positions, as in Fig. 4, the uppermost one of said plates engages and moves a push finger 46 of said two-way reversing switch 12, closing the switch 14.

When the switch 14 is closed, the automatic record player unit 2 and its related control circuit are the ones which are ready for operation; the title slips 36 then correctly reading with respect to the records, available for selection by the push buttons 8, to be played by said unit 2.

Conversely, when the finger knob 43 is pulled downwardly, as in Fig. 5, the program holder 31 is reversed; i. e. the title retaining plates 34 are reversed so that the titles on the slips 36 correspond to the records available to be played by the automatic record player unit 2a.

At the same time the push finger 46 of the two-way reversing switch 12 is released, whereupon the switch 14 opens and the other switch 14a closes. The switch 14a is interposed in controlling relation in one of the leads of the control circuit 11a for the master control box unit "No. 2," indicated on the drawing by the reference numeral 7a.

It will thus be evident that when switch 12 is reversed, as above, the control circuit for the automatic record player unit 2a is ready for operation, and in such event it is the control circuit for the automatic record player unit 2 which is blocked against operation upon opening of the switch 27a when the switch 28a closes to place the secondary motor energizing circuit 30a in operation. Here, the same as in connection with control of the automatic record player unit 2, the two-way switch 16 first energizes the primary relay 19a, followed by opening of the same and actuation of the secondary relay 26a to close switch 28a and open switch 27a.

In the diagrammatic illustrations of Figs. 1 and 2, the two-way reversing switch 12 is shown outside the control box 1 for the purpose of clarity, but in practice—as shown in Figs. 4 and 5—such switch is actually mounted in the top of the housing 32 for control by the uppermost one of the title retaining plates 34.

The foregoing invention provides a very practical and reliable system for the selective control of a pair of automatic phonographs from a common selection box, with effective means provided for visually indicating, and making possible the selection of, the records available on each phonograph.

The described novel, reversible program holder lends greatly to the convenience of use of the system, which holder also provides for the automatic switching from one to the other of the multiple control circuits.

The system also permits the use, without any major alteration, of conventional automatic phonographs and a conventional selection box; the latter being altered only in respect to the addition thereto of the reversible program holder.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Lettters Patent are desired:

A control system for the combination which includes a pair of automatic record changers and a manually operative selection box, each record changer having an electric motor-driven turntable assembly embodying a rotary, vertically movable spindle; said system comprising, for each motor-driven turntable assembly, a prinmary motor energizing circuit, a secondary motor energizing circuit, a primary relay having a relay closed switch interposed in the primary motor energizing circuit, an energizing circuit for the primary relay, a secondary relay having a relay closed switch interposed in the secondary motor energizing circuit, an energizing circuit for the secondary relay, and switch means responsive to vertical motion of the spindle normally holding the primary relay energizing circuit closed, but opening the latter and closing the secondary relay energizing circuit upon predetermined vertical motion of said spindle; each secondary relay including a separate relay opened switch interposed in the circuit for the other motor-driven turntable assembly.

References Cited in the file of this patent

UNITED STATES PATENTS

| | | | |
|---|---|---|---|
| 2,031,074 | Scheibell | Feb. 18, | 1936 |
| 2,219,257 | Henry | Oct. 22, | 1940 |
| 2,231,517 | Andres | Feb. 11, | 1941 |
| 2,243,698 | Freborg et al. | May 27, | 1941 |
| 2,324,940 | McGovern et al. | July 20, | 1943 |
| 2,519,299 | Vanderzee | Aug. 15, | 1950 |
| 2,558,505 | Andres | June 26, | 1951 |
| 2,612,710 | Fuller | Oct. 7, | 1952 |